United States Patent

Ishihara

[11] Patent Number: 5,208,825
[45] Date of Patent: May 4, 1993

[54] RANDOM POLARIZATION GAS LASER TUBE

[75] Inventor: Hiroyuki Ishihara, Tokyo, Japan
[73] Assignee: NEC Corporation, Tokyo, Japan
[21] Appl. No.: 681,924
[22] Filed: Apr. 8, 1991
[30] Foreign Application Priority Data
 Apr. 6, 1990 [JP] Japan .................. 2-91583
[51] Int. Cl.⁵ .............................. H01S 3/08
[52] U.S. Cl. ............................. 372/99; 372/107; 372/61; 372/29; 372/27; 372/105
[58] Field of Search ............ 373/92, 99, 107, 61, 373/29; 372/105, 27

[56] References Cited
U.S. PATENT DOCUMENTS
4,088,964 5/1978 Clow ......................... 372/92

Primary Examiner—Léon Scott, Jr.
Attorney, Agent, or Firm—Leydig, Voit & Mayer

[57] ABSTRACT

In a random polarization gas laser tube, a pair of mirrors constituting an optical resonator have anisotropic characteristics and aligned such that directions showing highest reflection intensity are orthogonal to each other to obtain a stable polarizing characteristics.

2 Claims, 3 Drawing Sheets

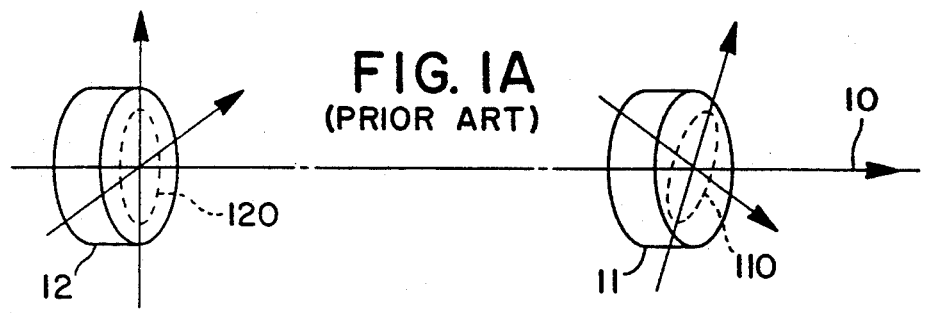
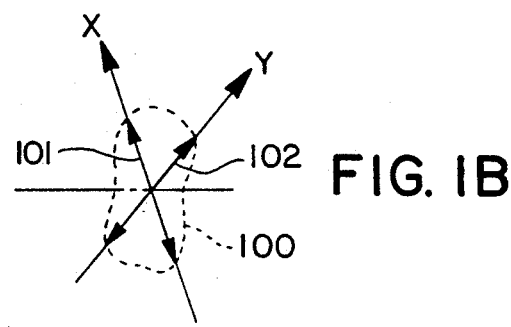
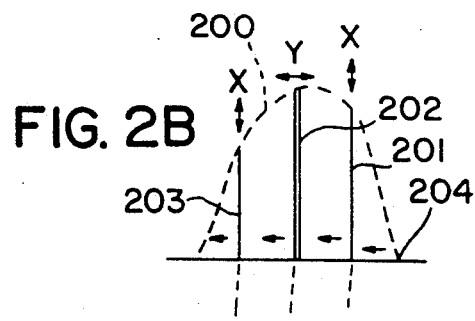
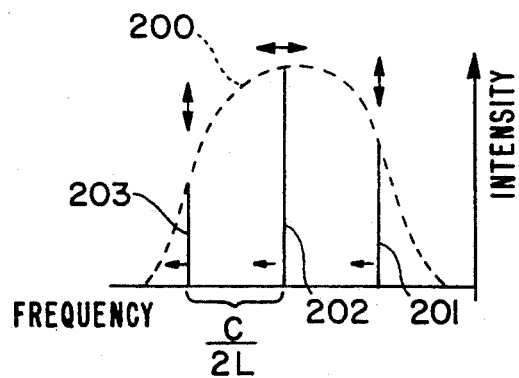
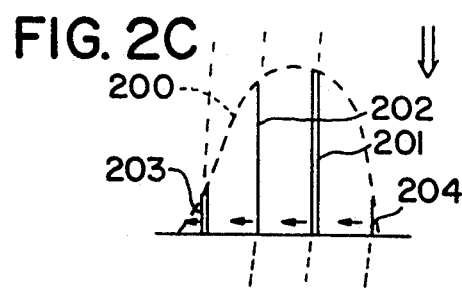
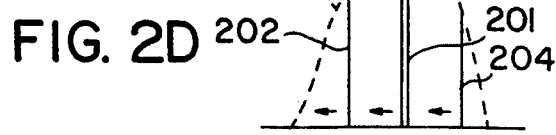

RANDOM POLARIZATION GAS LASER TUBE

BACKGROUND OF THE INVENTION

The present invention relates to an internal mirror type laser tube and, more particularly, to a mirror arrangement for a random polarization He-Ne gas laser tube.

In a conventional internal mirror type gas laser tube such as He-Ne gas laser tube, mutually orthogonal polarizing directions of output laser light are arbitrary with respect to an optical axis of the laser light and peculiar to individual laser tubes. This is because relative direction of anisotropic characteristics of a pair of mirrors have never been concerned at all and thus a pair of mirrors constituting an optical resonator have been arranged arbitrarily.

Referring to FIG. 1A, an output mirror 11 and a total reflective mirror 12 have inherent anisotropic characteristics, respectively as shown in dotted ellipse 110 and 120. A means for measuring such anisotropic characteristics will be described later.

When an optical reasonator is constituted by mounting the mirrors 11 and 12 on opposite ends of a laser tube envelope, the resonator exhibits anisotropic characteristics such as shown by a dotted line 100 in FIG. 1B. Mutually orthogonal polarizing directions of longitudinal mode of the output laser light 10 are determined selectively in such directions that oscillation is easier. In other words, internal gain is higher in that directions, or reflection intensity is higher in that directions. Accordingly, if relative directions of anisotropic characteristics of a pair of mirrors are arbitrary, such laser tube has peculiar anisotropic characteristics and polarizing directions.

Considering longitudinal mode oscillation, longitudinal mode oscillation occurs within a peculiar gain curve of an optical resonator as shown by a dotted line 200 in FIG. 2A and adjacent longitudinal modes 201, 202 and 203 have orthogonal polarizing directions ( ↕ ←→ ) and are separated from each other by C/2L, wherein the C represents velocity of light and the L represents resonator length. Further, frequencies of individual longitudinal modes are shifted with even small change of reasonator length due to influence of such as heat.

Assuming that an internal gain of either of mutually orthogonal two polarizing directions, for example, X direction 101 ( ↕ direction) is higher than that of the other, Y direction 102 (←→ direction), as shown in FIG. 1B, longitudinal mode tends to shift as shown in FIG. 2B to FIG. 2D. When the longitudinal modes are shifted from a state shown in FIG. 2B leftwardly, a right side mode 204 within the gain curve 200 is usually polarized in Y direction. However, since internal gain thereof in Y direction is low and hardly oscillates, it can oscillate in only X direction. Therefore, the stable state in which adjacent longitudinal modes have mutually orthogonal two polarizing directions is broken and, thus, it is shifted to such stable state (FIG. 2C) and, then, to the state shown in FIG. 2D, and the shift from that shown in FIG. 2B through that shown in FIG. 2C to that shown in FIG. 2D is repeated. That is, during this shift process from that shown in FIG. 2B to that shown in FIG. 2C, the polarizing direction of oscillating longitudinal mode is rotated by 90°.

At the moment of this 90° rotation, a phenomenon of over rotation tends to occur as shown in FIG. 3. That is, arbitrary arrangement of a pair of mirrors for an optical resonator causes a deformed anisotropic characteristics such as shown in FIG. 3. Although mutually orthogonal longitudinal modes 101 and 102, are easily oscillated in X and Y directions, respectively, directions close to the X and Y directions also have internal gains suitable to oscillate practically. Thus there may be a case where, over rotation occurs as indicated by an arrow 105 and then returns to stable X direction from the over-rotated position 104 as indicated by an arrow 106. This phenomenon causes a problem that an output laser light is abruptly changed due to change of polarizing direction of the laser light in a case, particularly, where laser light is used through optical parts such as polarizer and/or reflectors having anisotropic characteristics.

SUMMARY OF THE INVENTION

An object of the present invention is to provide a random polarization gas laser tube having a stable polarizing characteristics.

In a random polarization gas laser tube according to the present invention, a pair of mirrors constituting an optical resonator which have anisotropic characteristics are mounted such that directions thereof in which reflection intensity is the highest are orthogonal to each other.

BRIEF DESCRIPTION OF THE DRAWINGS

FIG. 1A is a perspective view of a pair of mirrors in a conventional optical resonator to illustrate a direction of anisotropic characteristics;

FIG. 1B shows anisotropic characteristics of oscillating laser light in the construction shown in FIG. 1A;

FIGS. 2A to 2D are characteristics curves to show longitudinal mode oscillation and their shift;

DESCRIPTION OF THE PREFERRED EMBODIMENT

Figure 4:
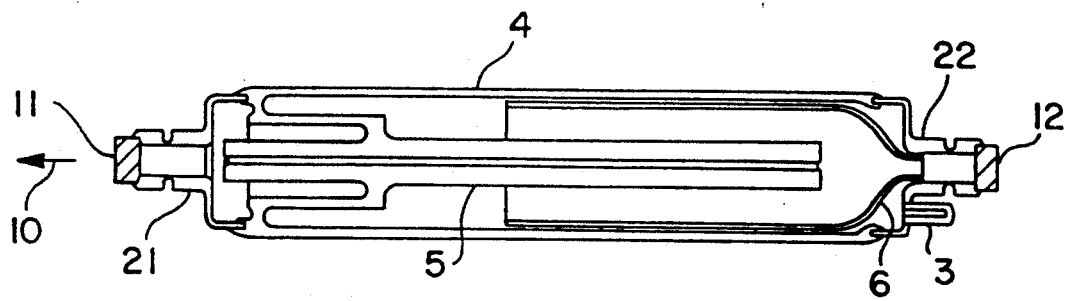
FIG. 4 is a cross section of an internal mirror type He-Ne gas laser tube to which the present invention is applied.

Referring to FIG. 4, an output mirror 11 has a transparency of in the order of 1% and sealed to a metal support 21 using sealant such as low meting point glass material. A total reflective mirror 12 is sealed to a metal support 22 having a metal exhaust tube 3. The metal supports 21 and 22 are mounted to the opposite ends of a glass tube 4 to form an outer envelope which is filled with He-Ne gas and within which a capillary glass tube 5 and an aluminum hollow cathode 6 are arranged. Illustrated laser tube structure is the same as the conventional one except for the alignment of the mirrors.

FIG. 5 illustrates directions of anisotropic characteristics of the mirrors 11 and 12 and a relation between mutually orthogonal two polarizing directions 101 and 102 of oscillating laser light 10. Further, FIGS. 6A and 6B show an example of a measuring method for measuring anisotropic characteristics of the mirrors 11 and 12 respectively. In FIG. 6A, linear polarized laser light 80 is directed substantially perpendicularly to reflective area 14 of the mirrors 11 and 12 and reflected light 82 therefrom are measured. Each of the mirrors 11 and 12 comprises a multilayered bielectric member formed by alternatively laminated two kinds of dielectric layers having different refractive indices. An ellipse shown by a dotted line 140 in FIG. 6B is a plot of reflection intensities when the mirrors 11 and 12 are rotated and the anisotropic characteristics of the mirrors are determined by magnitudes of a dotted arrows 142 as reflection intensity. As shown in FIGS. 6A and 6B, each of the mirrors 11 and 12 has an anisotropic reflection intensity in which the reflection intensity varies with the angular orientation of the mirror 11, 12 and is highest in a first direction.

Figure 5A:
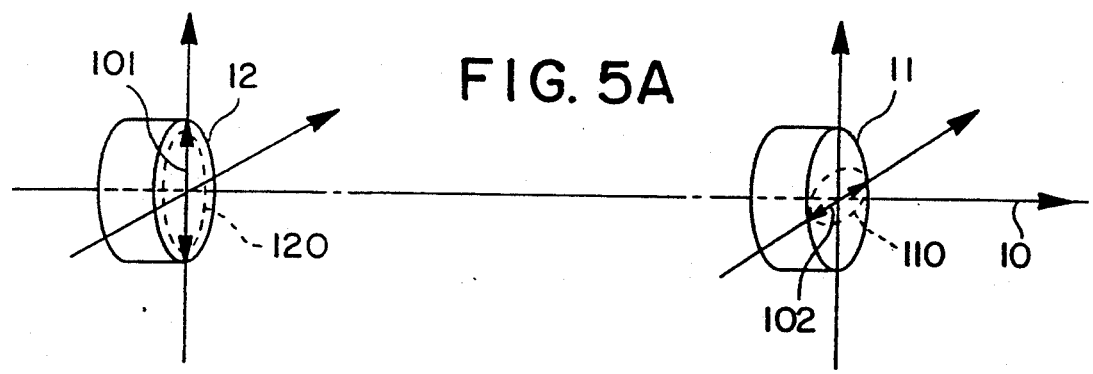
FIG. 5A is a perspective view for illustrating directions of anisotropic characteristics of the mirrors shown in FIG. 4 when assembled.
Figure 5B:
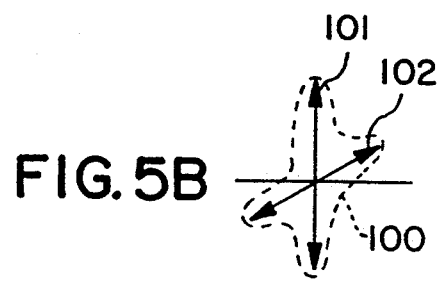
FIG. 5B is a characteristics curve showing a relation between mutually orthogonal two polarizing directions of laser light in the construction shown in FIG. 5A.
Figure 6A:
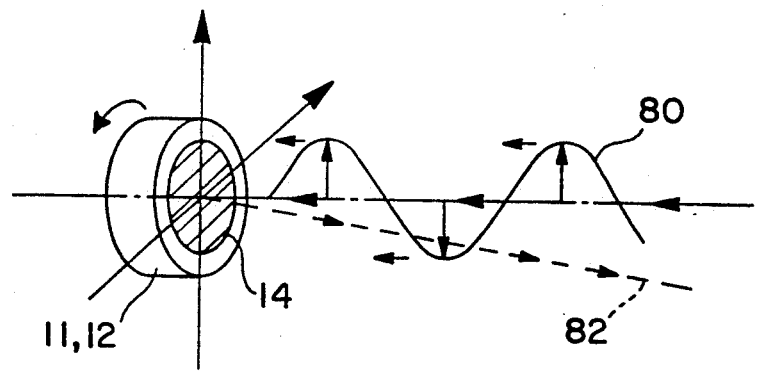
FIG. 6A is a perspective view of the mirrors for illustrating a measurement for measuring directions of anisotropic characteristics of the mirrors.
Figure 6B:
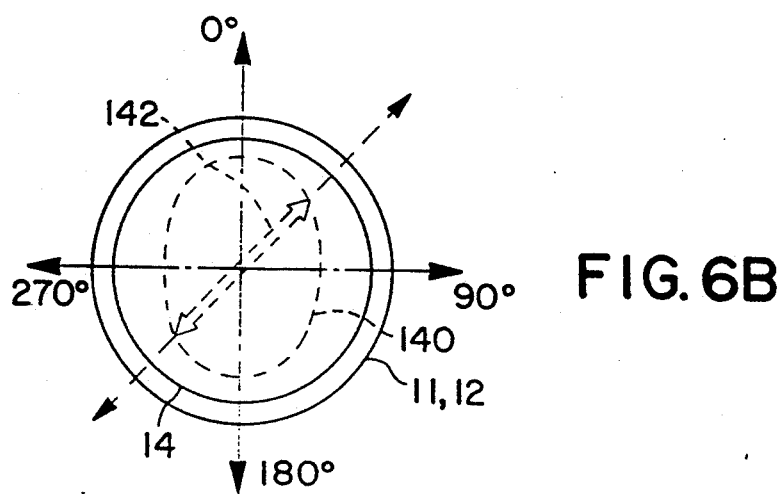
FIG. 6B shows anisotropic characteristics obtainable according to the method shown in FIG. 6A.

In FIG. 5A, by mounting the mirrors 11 and 12 such that directions 101 and 102 in which the mirrors 11 and 12 reflect laser light at high intensity are mutually orthogonal, the optical resonator exhibits high reflection intensity in only the orthogonal two directions 101 and 102 as shown in FIG. 5B, a selectively obtained polarizing direction of laser light 10 is fixed stably in these two directions.

Figure 3:
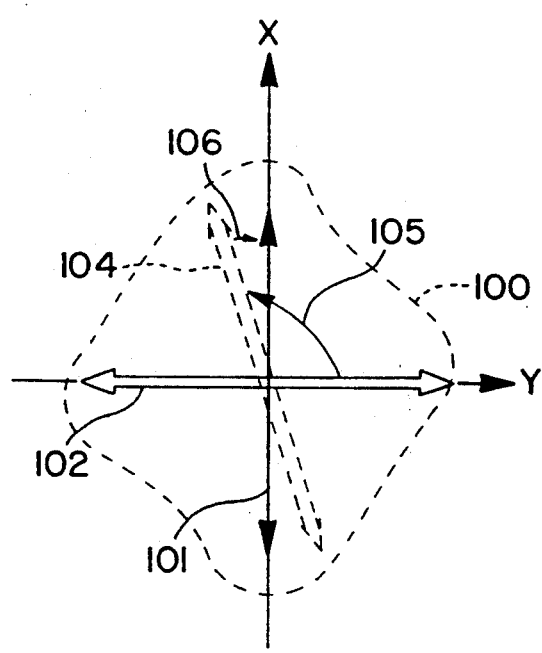
FIG. 3 is a characteristics curve to show a phenomenon in which the longitudinal mode polarizing direction, after rotated temporarily by an angle other than 90°, returns to a stable condition.

As described above, according to the present invention in which a pair of mirrors having anisotropic characteristics are assembled to form an optical resonator in such a manner that the direction of the reflection in which high reflection intensities are obtainable are mutually orthogonal, polarizing direction of output laser light is stably fixed in these two direction. Therefore, the problem inherent to the conventional technique that, as described with reference to FIG. 3, the polarizing directions of laser light is temporarily shifted from the stable condition is eliminated. Thus it is possible to obtain stable polarizing direction and output of a laser even if laser light is used through optical parts such as polarizer and reflectors, etc., which have anisotropic characteristics. It is clear from the foregoing explanation that the stronger the anisotropic characteristics (i.e., the smaller the ellipse ratio (minor axis/major axis) in FIG. 6B) is the more stable the polarizing characteristics.

Needless to say, the present invention can be applied to other gas laser tube such as argon ion laser tube.

What is claimed is:

1. A random polarization gas laser tube comprising:
    a tube defining an envelope filled with laser gas;
    a pair of electrodes provided in the envelope to discharge said gas; and
    a pair of mirrors, each of the mirrors having an anisotropic reflection intensity wherein the reflection intensity varies with the angular orientation of the mirror and is highest in a first direction, the mirrors being respectively positioned on opposite ends of the tube with the direction of highest reflection intensity of one of the mirrors being orthogonal to the direction of highest reflection intensity of the other mirror, whereby the laser tube polarization characteristics are stabilized.

2. The random polarization gas laser tube as claimed in claim 1, wherein said laser gas is He-Ne gas.

* * * * *